United States Patent
Kamperman et al.

(10) Patent No.: US 7,178,038 B2
(45) Date of Patent: Feb. 13, 2007

(54) APPARATUS AND METHOD FOR REPRODUCING USER DATA

(75) Inventors: Franciscus Lucas Antonius Johannes Kamperman, Eindhoven (NL); Antonius Adriaan Maria Staring, Eindhoven (NL); Johan Paul Marie Gerard Linnartz, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 763 days.

(21) Appl. No.: 10/196,300

(22) Filed: Jul. 16, 2002

(65) Prior Publication Data

US 2003/0021420 A1   Jan. 30, 2003

(30) Foreign Application Priority Data

Jul. 19, 2001   (EP)   ................................. 01202770

(51) Int. Cl.
| | |
|---|---|
| *H04L 9/00* | (2006.01) |
| *H04L 9/32* | (2006.01) |
| *G06F 11/30* | (2006.01) |
| *G06F 12/14* | (2006.01) |
| *H03M 1/68* | (2006.01) |
| *H04K 1/00* | (2006.01) |
| *H04N 7/16* | (2006.01) |
| *G06K 9/00* | (2006.01) |
| *G06F 17/30* | (2006.01) |

(52) U.S. Cl. ..................... 713/193; 713/171; 713/155; 380/277; 380/278; 380/279; 726/26

(58) Field of Classification Search ..................... None
See application file for complete search history.

(56) References Cited

U.S. PATENT DOCUMENTS 5,191,611 A * 3/1993 Lang ........................ 705/53

(Continued)

FOREIGN PATENT DOCUMENTS

EP   0978839 A1   9/2000

(Continued)

OTHER PUBLICATIONS

Wong, Chung Kei, et al. "Secure Group Communications Using Key Graphs" IEEE/ACM Transactions On Networking, vol. 8, No. 1, Feb. 2000. Found on the World Wide Web at: http://ieeexplore.ieee.org/iel5/90/18071/00836475.pdf?tp=&arnumber=836475&isnumber=18071.*

*Primary Examiner*—Gilberto Barrón
*Assistant Examiner*—Jeremiah Avery

(57) ABSTRACT

In an apparatus and a method for reproducing user data stored in encrypted form on a recording medium, in order to provide a higher level of protection against hacking of user data and, in particular, of decryption keys, which are used for encrypting said user data and which are also stored on the recording medium, an integrated unit calculates a decryption key using key data read from the recording medium, decrypts the user data read from said recording medium using the calculated decryption key, andre-encrypts the decrypted data using a re-encryption key. The re-encrypted data and the re-encryption key are then transmitted to an application unit for decrypting the re-encrypted data using the re-encryption key and for reproducing the decrypted data.

10 Claims, 1 Drawing Sheet

U.S. PATENT DOCUMENTS

| | | | | |
|---|---|---|---|---|
| 5,513,260 | A | * | 4/1996 | Ryan .......................... 380/200 |
| 5,867,579 | A | * | 2/1999 | Saito ........................... 705/57 |
| 5,953,419 | A | * | 9/1999 | Lohstroh et al. ............ 713/165 |
| 6,611,812 | B2 | * | 8/2003 | Hurtado et al. ............... 705/26 |
| 6,691,149 | B1 | * | 2/2004 | Yokota et al. .............. 709/201 |
| 6,711,553 | B1 | * | 3/2004 | Deng et al. ................... 705/57 |
| 6,813,709 | B1 | * | 11/2004 | Benardeau ................. 713/172 |
| 6,850,252 | B1 | * | 2/2005 | Hoffberg .................... 715/716 |
| 6,938,162 | B1 | * | 8/2005 | Nagai et al. ................ 713/189 |

FOREIGN PATENT DOCUMENTS

| | | | |
|---|---|---|---|
| EP | 1220541 A2 | * | 7/2002 |
| WO | WO 9816033 A1 | * | 4/1998 |

\* cited by examiner

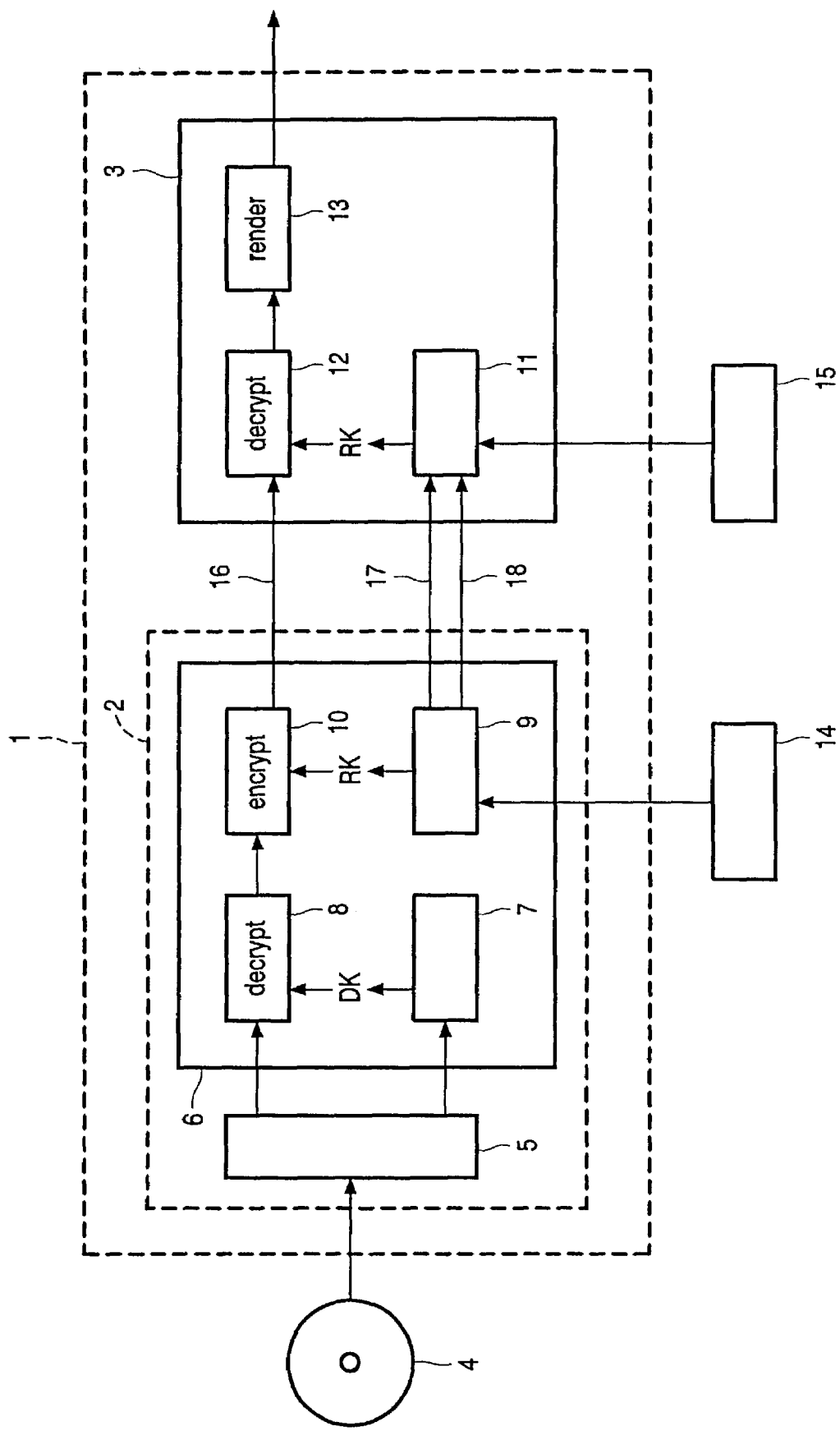

APPARATUS AND METHOD FOR REPRODUCING USER DATA

BACKGROUND OF THE INVENTION

1. Field of the Invention

The invention relates to an apparatus and a method for reproducing user data stored in encrypted form on a recording medium, as well as to an integrated circuit for use in such an apparatus or method. The invention refers particularly to the protection of information stored on removable recording media, such as video data on a DVD.

If user data, e.g., video data, audio data, software or application data, is stored on a removable recording medium in encrypted form, it is most often required that an authorized application can read and use said user data, if allowed, from such removable recording media without the need to retrieve the decryption key from a separate location, such as the Internet. Hence, the decryption key has to be stored on the medium together with the encrypted user data.

2. Description of the Related Art

However, the decryption key has to be hidden from an unauthorized access. Known techniques for hiding the decryption key are the use of a media-key-block with secret player keys which are, for instance, used in the known Content Scrambling System (CSS) and in Content Protection for Recordable Media (CPRM). Another method for hiding the decryption key in electronic signals using secret signal processing methods is known from U.S. Pat. No. 6,157,606. Therein, a master key is used for encrypting main data in a pit-width direction by changing a light amount of a laser beam to then record it on an optical recording medium.

In the current protection systems, such as CSS and CPRM, the calculation of the decryption key is performed inside an authorized PC application running in an application unit of a PC. These authorized applications contain protection mechanisms against the extraction of secrets, such as player keys needed for media-key-block calculation, and against any modification of the behavior of the application, such as providing any protected data in the clear to other applications. These protection mechanisms for PC software applications are, however, known to be weak and to fail regularly. If the authorized application and/or the application unit is tampered with by hackers, it could be changed such that it provides the hacker with the decryption key of the protected user data. The hacker would now be able to extract and publish the decryption keys of many published recording media, which would allow other hackers to get easy access to the protected user data using unauthorized applications.

This is a serious security problem. The illegal distribution of decryption keys does potentially produce more damage than the illegal distribution of protected user data in the clear because the protected user data includes a large amount of data, usually many megabytes and is, therefore, time-consuming. In contrast, the decryption keys include only a small amount of data, usually not much more than one kilobyte, and can be distributed quickly and widely.

SUMMARY OF THE INVENTION

It is therefore an object of the present invention to provide an apparatus and a method for reproducing user data stored in encrypted form on a recording medium which provide a higher level of protection, in particular of the decryption key, against theft through hacking of a PC application and/or application unit.

This object is achieved in an apparatus for reproducing user data stored in encrypted form on a recording medium, comprising means for reading user data and key data from said recording medium; an integrated unit including means for calculating a decryption key using said key data, means for decrypting user data read from said recording medium using said calculated decryption key, and means for re-encrypting said decrypted data using a re-encryption key; means for transmitting said re-encrypted data from said integrated unit to an application unit; and an application unit for decrypting said re-encrypted data using said re-encryption key and for reproducing the decrypted data.

This object is further achieved by a method corresponding to such apparatus. An integrated unit for use in such an apparatus comprises means for calculating a decryption key using key data read from said recording medium; means for decrypting user data read from said recording medium using said calculated decryption key; and means for re-encrypting said decrypted data using a re-encryption key to obtain re-encrypted data for being transmitted to an application unit for decrypting said re-encrypted data using said re-encryption key and for reproducing the decrypted data.

The present invention is based on the idea to decrypt and to re-encrypt the user data read from the recording medium inside an integrated unit in the drive and not, as is usually done, inside an application unit using a PC application. Such an integrated unit is much more difficult to hack compared to an application unit, and thus provides an improved protection for the decryption key. In addition, the calculation of the decryption key used for decrypting the user data and the calculation of a re-encryption key used for re-encrypting the decrypted user data are also performed inside the integrated unit which even more improves protection of the decryption key. The decryption key thus never leaves the integrated unit, neither in encrypted form nor in decrypted form. Further, the decrypted user data that exists between decryption and re-encryption is never visible outside the integrated unit which also provides a higher level protection against hacking of user data.

In order to enable the application unit to decrypt and then to reproduce the user data provided from the integrated unit to the application unit, the re-encryption key or any data for calculating the re-encryption key needs to be provided to the application unit. This can be done by different methods, e.g., using public key cryptography or by transmitting the re-encryption key over a secure authenticated channel (SAC) from the integrated unit to the application unit. Alternatively, also a symmetric cryptographic method can be used for this purpose.

Preferred embodiments of the invention are included in the dependent claims. It shall be understood that the above apparatus, method and integrated circuit can be developed further and can have identical or similar embodiments.

Preferably, said integrated unit is included in a drive unit for reading recording media, and said drive unit as well as said application unit are included in a computer, like a PC. It is further preferred that the recording medium is an optical recording medium, in particular a disc, which may be recordable or rewriteable and which is preferably a CD or a DVD storing any kind of user data. Alternatively, the recording medium may also be another, comparable medium, e.g., a solid state memory card.

In a still further preferred embodiment, the integrated unit is realized as an integrated circuit which cannot easily be hacked from outside. However, said integrated unit may also be understood as another integrated component, like, e.g., an optical drive unit. If such an integrated component is found to be secure enough, re-encryption may be implemented partly in hardware and partly in firmware, e.g., re-encryption key generation may be implemented in firmware. This might be acceptable from a security point of view as the re-encryption key will also be present in the application unit which is a less secure environment than such an integrated component, like an optical drive unit.

BRIEF DESCRIPTION OF THE DRAWING

The invention will now be explained in more detail with reference to the drawing in which the sole FIGURE shows a block diagram of a reproducing apparatus according to the invention.

DESCRIPTION OF THE PREFERRED EMBODIMENTS

In the FIGURE, a personal computer 1 is shown comprising a drive unit 2 and an application unit 3. If a user intends to reproduce user data stored on a recording medium 4, like a DVD-ROM, e.g., to replay video data stored in a DVD in MPEG-format, the medium 4 is inserted into the drive 2 wherein said user data and key data are read by reading means 5. It should be noted that both the user data and the key data are stored on the medium 4 in encrypted form. It should further be noted that there are different ways of encrypting user data and key data for storing it on recording media, but that it is not relevant for the present invention which particular way is used.

The read data are then input into an integrated unit 6, which is preferably realized by an integrated circuit (IC) comprising different means for calculating keys and for decrypting and re-encrypting user data. At first, the decryption key is calculated in a key calculation unit 7 using the read key data inputted from the reading means 5. This decryption key DK is required for decrypting the read user data inputted from the reading means 5 to the decryption unit 8. This decryption key DK is identical to an encryption key which has been used for encrypting the user data before storing it on the medium 4, or is a key corresponding to this encryption key.

After decryption, the user data is re-encrypted in a re-encryption unit 10 instead of being outputted in the clear over a bus 16 directly to the application unit 3, since such a transmission of user data in the clear over a bus is not very secure and gives hackers an opportunity to read and copy the user data.

The re-encryption key RK used for re-encrypting the user data is also calculated inside the integrated unit 6 by an appropriate key calculation unit 9. Since this re-encryption key RK has also to be known to the application unit 3 in order to decrypt the user data therein, a secure authenticated channel 17, 18 between the drive unit 2 and the application unit 3 is established. To authorize the application running on the application unit 3, its public key is certified by a certification authority 15.

If the application is thus authorized, a corresponding indication thereof, in particular a public key of the application, is transmitted via transmission line 17 from the application unit 3 to the drive 2, in particular, to the key calculation unit 9 of the integrated unit 6. The key calculation unit 9 may then authorize the application by checking the certificate of the public key application with a public key licensing authority 14 and by checking if the application possesses the corresponding private key which is part of the SAC functionality.

After final authorization of the application, the encrypted re-encryption key RK or any other data relating to the re-encryption key, are transmitted from the key calculation unit 9 to the key calculation unit 11 of the application unit 3 via transmission line 18. The key calculation unit 11 is thus able to calculate the re-encryption key RK such that the decryption unit 12 can decrypt the re-encrypted user data provided via transmission line 16. It should be noted that the transmission lines 16, 17 and 18 are included in the PC bus of the computer 1.

After decrypting the user data in decryption unit 12, it can be completely reproduced and rendered for playback by render unit 13.

The invention thus provides a high level of protection against theft of user data and/or of decryption keys used for encrypting the user data before storing it on the recording medium. Neither the user data nor the decryption keys are transmitted over a bus of the computer or are existent outside of the integrated unit in the clear. It is thus not possible to retrieve the decryption key by hacking the application running on the computer.

The invention claimed is:

1. An apparatus for reproducing user data stored in encrypted form on a recording medium, said apparatus comprising:
    means for reading user data and key data from said recording medium;
    an integrated unit including means for calculating a decryption key using said key data, means for decrypting user data read from said recording medium using said calculated decryption key, and means for re-encrypting said decrypted data using a re-encryption key;
    means for transmitting said re-encrypted data from said integrated unit to an application unit; and
    an application unit for decrypting said re-encrypted data using said re-encryption key, and for reproducing the decrypted data.

2. The apparatus as claimed in claim 1, wherein said integrated unit and/or said application unit further comprises:
    means for calculating said re-encryption key.

3. The apparatus as claimed in claim 1, wherein said apparatus further comprises;
    public key cryptography means for exchanging information on said re-encryption key.

4. The apparatus as claimed in claim 3, wherein said public key cryptography means are employed to set up a secure authenticated channel for transmitting said re-encryption key from said integrated unit to said application unit.

5. The apparatus as claimed in claim 1, wherein said integrated unit is included in a drive unit for reading recording media, and wherein said drive unit and said application unit are included in a computer.

6. The apparatus as claimed in claim 1, wherein said recording medium is an optical recording medium, including a CD or a DVD.

7. The apparatus as claimed in claim 1, wherein said integrated unit is an integrated circuit.

8. A method for reproducing user data stored in encrypted form on a recording medium, said method comprising the steps of:
    reading user data and key data from said recording medium;

calculating a decryption key using said key data;
decrypting user data read from said recording medium using said calculated decryption key;
re-encrypting said decrypted data using a re-encryption key;
decrypting said re-encrypted data using said re-encryption key in said application unit; and
reproducing the decrypted data,
wherein said steps of calculating, decrypting and re-encrypting are carried out in an integrated unit.

9. An integrated unit for use in an apparatus as claimed in claim 1 for reproducing user data stored in encrypted form on a recording medium, said integrated unit comprising:

means for calculating a decryption key using key data read from said recording medium;
means for decrypting user data read from said recording medium using said calculated decryption key; and
means for re-encrypting said decrypted data using a re-encryption key to obtain re-encrypted data for subsequent transmission to an application unit for decrypting said re-encrypted data using said re-encryption key and for reproducing the decrypted data.

10. The integrated unit as claimed in claim 9, wherein said integrated unit is an integrated circuit.

* * * * *